(12) United States Patent
Ohshima et al.

(10) Patent No.: US 8,273,816 B2
(45) Date of Patent: Sep. 25, 2012

(54) ALUMINA FIBER AGGREGATE, PROCESS FOR PRODUCING THE SAME, AND USE THEREOF

(75) Inventors: Yasutaka Ohshima, Tokyo (JP); Isamu Hirano, Tokyo (JP); Takayuki Higuchi, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 312 days.

(21) Appl. No.: 12/682,471

(22) PCT Filed: Sep. 29, 2008

(86) PCT No.: PCT/JP2008/067679
§ 371 (c)(1),
(2), (4) Date: Apr. 9, 2010

(87) PCT Pub. No.: WO2009/048000
PCT Pub. Date: Apr. 16, 2009

(65) Prior Publication Data
US 2010/0207054 A1  Aug. 19, 2010

(30) Foreign Application Priority Data
Oct. 11, 2007  (JP) ................................. 2007-265737

(51) Int. Cl.
*C08K 3/18* (2006.01)
(52) U.S. Cl. ......................................... 524/430; 252/71
(58) Field of Classification Search ................... 524/430
See application file for complete search history.

(56) References Cited

U.S. PATENT DOCUMENTS

| | | |
|---|---|---|
| 6,746,979 B2 | 6/2004 | Shoji et al. |
| 7,182,999 B2 | 2/2007 | Ohashi et al. |
| 2006/0216225 A1* | 9/2006 | Kakikura et al. ............. 423/625 |

FOREIGN PATENT DOCUMENTS

| | | |
|---|---|---|
| JP | 58-095612 | 6/1983 |
| JP | 3-212454 A | 3/1991 |
| JP | 03212454 * | 9/1991 |

(Continued)

OTHER PUBLICATIONS

Derwent Abstract of JP 03-212454.*

(Continued)

*Primary Examiner* — Doris Lee
(74) *Attorney, Agent, or Firm* — Foley & Lardner LLP

(57) ABSTRACT

An object of the invention is to provide an alumina fiber aggregate which, when used as a filler in various materials such as, e.g., resins, coating materials, metals, and ceramics, enables the mixtures to have reduced viscosity and thereby heightens the productivity of products containing alumina fibers, and which enables cured thermosetting resins to have a sufficiently heightened thermal conductivity.

This alumina fiber aggregate, when examined by the electron microscope method, gives a frequency distribution regarding number of fibers, wherein the number of fibers having a fiber length of 50-200 μm is 70% or more (including 100%), the number of fibers having a fiber length smaller than 50 μm is 30% or less (including 0), the number of fibers of 50-100 μm is 30-50%, the number of fibers longer than 100 μm but not longer than 200 μm is 30-50%, and the number of fibers longer than 200 μm is 20% or less (including 0). The fibrous mass comprises 70-100% by mass of $Al_2O_3$ and 0-30% by mass of $SiO_2$.

3 Claims, 1 Drawing Sheet

FOREIGN PATENT DOCUMENTS

| | | |
|---|---|---|
| JP | 05-253547 | 10/1993 |
| JP | 7-178371 A | 7/1995 |
| JP | 08-141509 | 6/1996 |
| JP | 08-333176 | 12/1996 |
| JP | 11-319717 A | 11/1999 |
| JP | 2000-038646 | 2/2000 |
| JP | 2001-246327 A | 9/2001 |
| JP | 2002-105610 A | 4/2002 |
| JP | 2005-314484 | 11/2005 |
| JP | 2006-342199 A | 12/2006 |
| JP | 2007-009089 | 1/2007 |

OTHER PUBLICATIONS

Communication (Supplementary EP Search Report) in EP Appln No: 08 83 6938 dated Sep. 28, 2011.

International Search Report mailed Jan. 6, 2009 received in PCT/JP2008/067679.

Notification of Reasons for Refusal in JP Appln. No. 2009-536976 dated Jan. 31, 2012.

* cited by examiner

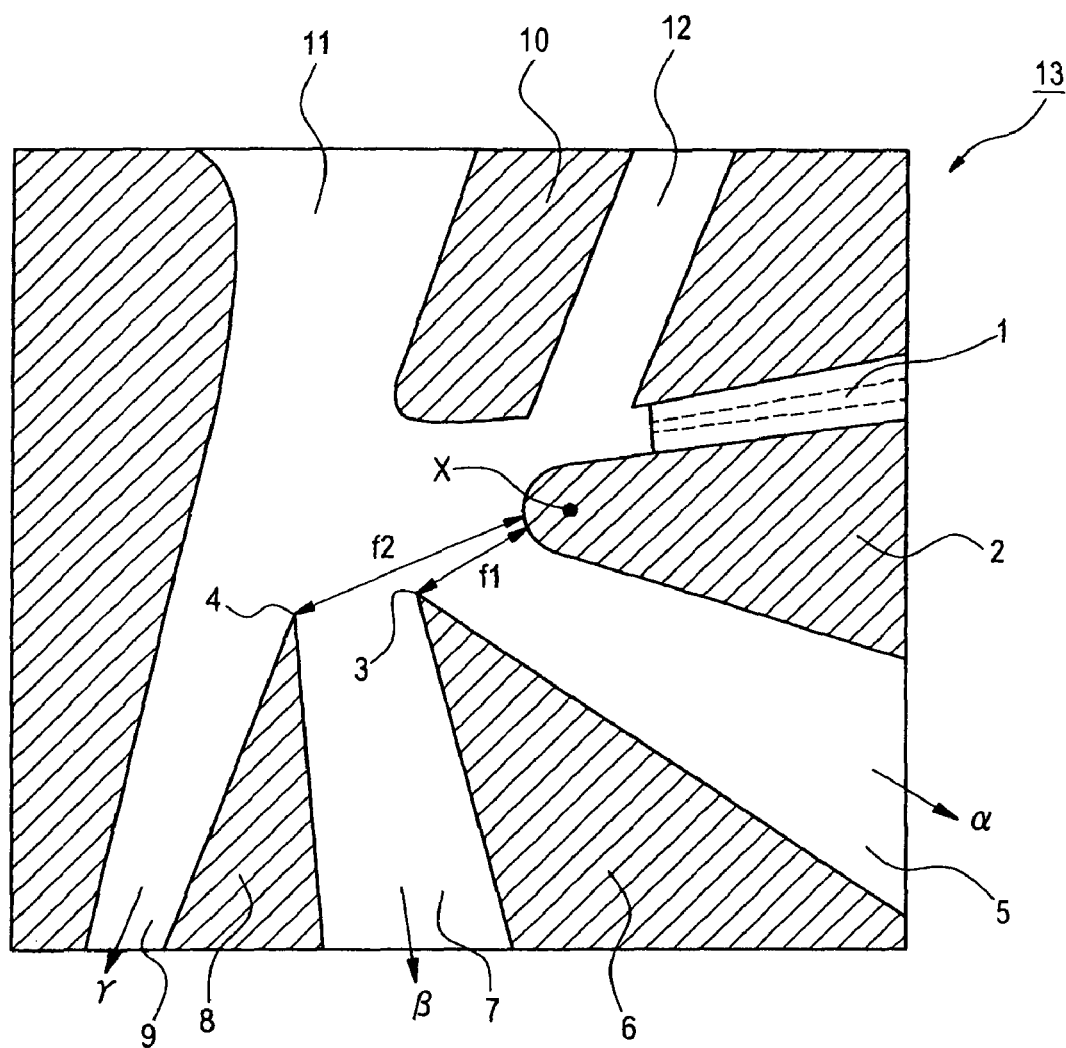

ALUMINA FIBER AGGREGATE, PROCESS FOR PRODUCING THE SAME, AND USE THEREOF

TECHNICAL FIELD

The present invention relates to an alumina fiber aggregate, a process for producing the same, and a use of the same. More particularly, the invention relates to an alumina fiber aggregate having regulated fiber lengths which, when used as a functional filler in various materials such as resins, coating materials, and ceramics, imparts reduced viscosity and satisfactory moldability to the mixtures and which, when incorporated especially into resins, enables the resins to give resin moldings having an improved thermal conductivity.

BACKGROUND ART

Function impartation to various materials by incorporating an alumina fiber aggregate thereinto has a problem that the mixtures have increased viscosity, resulting in poor productivity. In particular, in the case of thermosetting resins among various materials, although techniques for heightening the thermal conductivity by incorporating an alumina material have been investigated, a sufficient improvement has not been attained.

DISCLOSURE OF THE INVENTION

Problems that the Invention is to Solve

It is thought that, in order to reduce the viscosity of a mixture containing any of various materials and an alumina fiber aggregate (hereinafter simply referred to also as "mixture"), an effective method is to regulate the lengths of the fibers constituting the alumina fiber aggregate so as to be within a given range rather than to regulate the lengths thereof so as to be exceedingly short as in whiskers or exceedingly long as in long fibers. Patent document 1 proposes that when a metal is used among various materials, an alumina fiber aggregate in which alumina fibers having a fiber length of 10-100 μm account for 85% or more is used. However, when this alumina fiber aggregate was used as a filler for resins, the mixtures did not have sufficiently reduced viscosity and resin moldings were not able to have a sufficiently heightened thermal conductivity. Furthermore, the production of these alumina fibers required much time and labor because of the necessity of underwater pulverization.
Patent Document 1: JP-A-2002-105610

An object of the invention is to regulate the fiber length distribution of an alumina fiber aggregate to thereby reduce the viscosity of mixtures and heighten the productivity of products containing alumina fibers and, in particular, when used as a thermosetting resin filler, to sufficiently heighten the thermal conductivity of cured resins obtained from the thermosetting resins.

Means for Solving the Problems

The invention provides an alumina fiber aggregate which, when examined by the electron microscope method, gives a frequency distribution regarding number of fibers, wherein the number of fibers having a fiber length of 50-200 μm is 70% or more (including 100%), the number of fibers having a fiber length smaller than 50 μm is 30% or less (including 0), the number of fibers of 50-100 μm is 30-50%, the number of fibers longer than 100 μm but not longer than 200 μm is 30-50%, and the number of fibers longer than 200 μm is 20% or less (including 0), and which comprises 70-100% by mass of $Al_2O_3$ and 0-30% by mass of $SiO_2$.

It is preferred that the alumina fiber aggregate of the invention is an alumina fiber aggregate wherein the number of fibers having a fiber length of 50-200 μm is 80% or more (including 100%), the number of fibers having a fiber length smaller than 50 μm is 10% or less (including 0), the number of fibers of 50-100 μm is 35-45%, the number of fibers longer than 100 μm but not longer than 200 μm is 35-45%, the number of fibers longer than 200 μm is 15% or less (including 0), and the number of fibers longer than 300 μm is 5% or less (including 0), wherein the fiber aggregate has an average fiber diameter of 3-10 μm and the number of fibers having a fiber diameter smaller than 3 μm is less than 5%.

The invention further provides a process for producing the alumina fiber aggregate of the invention, wherein the process comprises grinding cottony alumina fibers comprising 70-100% by mass of $Al_2O_3$ and 0-30% by mass of $SiO_2$ while applying a pressure of 0.1-20 MPa thereto and then classifying the ground fibers. It is preferred, in this case, that the classification is conducted with respect to classification points of 50 μm and 200 μm in terms of fiber length and the fibers intermediate between the two classification points are collected. It is also preferred to conduct the classification with an air classifier which is based on the Coanda effect.

When the classification is conducted with an air classifier which is based on the Coanda effect, it is preferred that the classifier is an air classifier which has a Coanda block, a first classifying edge block, and a second classifying edge block, wherein the first and second classifying edge blocks are disposed in this order in a direction away from the Coanda block side, and which further has a first classifying edge disposed at the tip of the first classifying edge block and a second classifying edge disposed at the tip of the second classifying edge block, and in which the distance f1 between the vertex of the first classifying edge and the surface of the Coanda block, as measured on the straight line connecting the center point of a circle formed with the curved surface of the Coanda block to the vertex of the first classifying edge, is regulated to 10-30 mm, preferably 10-15 mm. It is also preferred that the distance f2 between the vertex of the second classifying edge and the surface of the Coanda block, as measured on the straight line connecting the center point of a circle formed with the curved surface of the Coanda block to the vertex of the second classifying edge, is regulated to 30-50 mm, more preferably 30-40 mm.

It is furthermore preferred that in the air classifier based on the Coanda effect, air having a pressure of 0.2-0.3 MPa is injected from a raw-material feed nozzle.

The invention furthermore provides a cured thermosetting resin which comprises the alumina fiber aggregate of the invention.

Advantages of the Invention

In the same amount of alumina fiber aggregate, mixtures containing the alumina fiber aggregate have lower viscosity than mixtures containing conventional alumina fibers. As a result, the productivity of products containing alumina fibers can be heightened. Those mixtures can be used to produce small and thin parts because of the reduced viscosity thereof. Furthermore, by incorporating the alumina fiber aggregate into thermosetting resins, e.g., epoxy resins, the thermal conductivity of cured objects obtained from these resins can be rendered exceedingly high.

BRIEF DESCRIPTION OF THE DRAWING

FIG. 1 is a diagrammatic sectional view illustrating one example of the important part of an air classifier based on the Coanda effect.

DESCRIPTION OF REFERENCE NUMERALS AND SIGNS 1 raw-material feed nozzle; 2 Coanda block; 3 first classifying edge; 4 second classifying edge; 5, 7, 9 conduit; 6 first classifying edge block; 8 second classifying edge block; 10 air introduction block; 11, 12 air introduction passage; 13 air classifier; x center point of Coanda block 2; f1 distance between the vertex of first classifying edge 3 and the surface of Coanda block 2 as measured on the straight line connecting the center point x of Coanda block 2 to the vertex of first classifying edge 3; f2 distance between the vertex of second classifying edge 4 and the surface of Coanda block 2 as measured on the straight line connecting the center point x of Coanda block 2 to the vertex of second classifying edge 4; α jet containing large amount of fibers mainly including fibers having length smaller than 50 μm; β jet containing large amount of fibers mainly including fibers having length of 50-200 μm; γ jet containing large amount of fibers mainly including fibers having length exceeding 200 μm.

BEST MODE FOR CARRYING OUT THE INVENTION

The alumina fiber aggregate of the invention is constituted of an aggregate of fibers which have a chemical composition comprising 70-100% by mass of $Al_2O_3$ and 0-30% by mass of $SiO_2$. The fibers constituting the aggregate each preferably has an aspect ratio of 3 or higher. The alumina may be any of α-alumina, γ-alumina, δ-alumina, θ-alumina, and the like. In particular, what includes α-alumina and has the above composition has high thermal conductivity and high heat resistance. The chemical composition can be determined by an ordinary method such as, e.g., fluorescent X-ray spectroscopy or chemical analysis.

A first requisite to the alumina fiber aggregate of the invention is that the fibrous aggregate, when examined by the electron microscope method, gives a frequency distribution regarding number of fibers, wherein the number of fibers having a fiber length of 50-200 μm is 70% or more (including 100%). In case where the number of these fibers is less than 70%, mixtures have an increased viscosity and the productivity of products containing alumina fibers is not sufficiently heightened. Furthermore, it is difficult to sufficiently heighten the thermal conductivity of products containing alumina fibers. It is preferred that the number of those fibers is 80% or more (including 100%).

A second requisite to the alumina fiber aggregate of the invention is that, in the frequency distribution regarding number of fibers obtained by the electron microscope method, the number of fibers having a fiber length smaller than 50 μm is 30% or less (including 0), the number of fibers having a fiber length of 50-100 μm is 30-50%, the number of fibers having a fiber length larger than 100 μm but not larger than 200 μm is 30-50%, and the number of fibers having a fiber length larger than 200 μm is 20% or less (including 0).

In case where the number of fibers having a fiber length smaller than 50 μm is more than 30% or where the number of fibers having a fiber length of 50-100 μm is less than 30%, this means that relatively long fibers are contained in a larger amount. As a result, mixtures have an increased viscosity and the productivity of products containing alumina fibers is not sufficiently heightened. When the number of fibers having a fiber length of 50-100 μm is more than 50%, this case also results in increased viscosities of mixtures and in the same phenomenon. In case where the number of fibers having a fiber length larger than 100 μm but not larger than 200 μm is less than 30%, products containing alumina fibers have a reduced thermal conductivity. In case where the number thereof exceeds 50%, mixtures have an increased viscosity. From the standpoints of the viscosity of mixtures and the thermal conductivity of products containing alumina fibers, it is preferred that the number of fibers having a fiber length exceeding 200 μm is as small as possible. However, contents thereof up to 20% are allowable.

It is especially preferred that the number of fibers having a fiber length smaller than 50 μm is 10% or less (including 0), the number of fibers having a fiber length of 50-100 μm is 35-45%, the number of fibers having a fiber length larger than 100 μm but not larger than 200 μm is 35-45%, the number of fibers having a fiber length larger than 200 μm is 15% or less (including 0), and the number of fibers having a fiber length larger than 300 μm is 5% or less (including 0).

It is preferred that the alumina fiber aggregate of the invention has an average fiber diameter, as determined by the electron microscope method, of 3-10 μm and that the number of fibers having a fiber diameter smaller than 3 μm is less than 5%. In case where the average fiber diameter thereof exceeds 10 μm, the number of fibers per unit mass becomes too small, resulting in a possibility that a sufficient reinforcing effect might not be obtained. In case where the average fiber diameter thereof is smaller than 3 μm, not only mixtures have exceedingly enhanced viscosity but also there is a higher possibility that such fibers might fly off during operation and be inhaled. For these reasons, the content of fibers having a fiber diameter smaller than 3 μm is preferably lower than 5%.

The electron microscope method is as follows.

<Sample Preparation>

A conductive carbon tape is applied to a sample table, and about 0.5 g of a sample is dispersed on the tape. Thereafter, compressed air is blown against the sample to remove excess fibers.

<Measurement>

The sample is set on a scanning electron microscope (SEM) (e.g., "JSM-5300", manufactured by JEOL), and a photograph thereof is taken at a magnification of 100 diameters. The diameters and lengths of arbitrarily selected 1,000 fibers are measured with a commercial device (e.g., digital calipers manufactured by Mitutoyo Corp.) to determine a frequency distribution regarding number of fibers, an average fiber diameter, and an average fiber length. Incidentally, fiber lengths are corrected with an international standard sample (Hitachi Standard Meso-Scale HMS-2000, manufactured by Hitachi Science Systems Ltd.). The method of correction is as follows. First, pattern pitches for dimensional calibration are observed under the same conditions as in the sample examination. The pattern pitch having any desired length is repeatedly measured 10 times, and an average of the found values is calculated. From this average value and the average value shown on the standard sample, a calibration factor is calculated using the equation: calibration factor=(average value given on the test report for the standard sample)/(average value for the pattern pitch determined through 10 repeated measurements). By multiplying the actually measured fiber lengths by this calibration factor, corrected values are obtained.

The alumina fiber aggregate of the invention can be produced by the process of the invention for producing an alumina fiber aggregate. The basic technique of the production process of the invention resides in that cottony alumina fibers as a raw material are ground and classified under specific conditions. This process is explained below in detail.

The cottony alumina fibers to be used as a raw material are cottony alumina fibers comprising 70-100% by mass of $Al_2O_3$ and 0-30% by mass of $SiO_2$. For example, trade name "Alsen (Bulk)", manufactured by Denki Kagaku Kogyo K.K., is suitable. This cottony raw material includes fibers having a fiber length of 100 μm to 10 cm, the number of which is generally 50% or more.

For pulverizing a cottony raw material, a press grinder, ball mill, stirring pulverizer, roll crusher, or the like can be used. In the invention, however, a technique is employed in which the raw material is press-ground while applying a pressure of 0.1-20 MPa thereto. The press grinding is a technique in which a cottony raw material is placed between upper and lower pressing plates and a pressure is applied to the raw material from the upper and lower sides to grind the fibers. Examples of commercial products thereof include "Table Press" and "Rotary Press", both manufactured by Sansho Industry Co., Ltd., and "Newton Press", manufactured by NPa System Co., Ltd.

The pressing pressure is 0.1-20 MPa, preferably 1-10 MPa. In case where the pressure is lower than 0.1 MPa, grinding is insufficient and the resultant ground fibers are difficult to feed to a classifier. In case where the pressure exceeds 20 MPa, fiber lengths become too short and it is difficult to efficiently produce an alumina fiber aggregate having the fiber length distribution according to the invention. The fiber length distribution of an alumina fiber aggregate can be regulated with pressing pressure. For example, by lowering the pressing pressure toward 0.1 MPa, the content of fibers having a fiber length of 100-200 μm can be increased. By heightening the pressing pressure toward 20 MPa, the content of fibers having a fiber length of 50-100 μm can be increased and the content of fibers having a fiber length exceeding 300 μm can be reduced.

The reasons for the use of press grinding are as follows. Press grinding is capable of preventing the overgrinding phenomenon in which fibers that have already been shortened are further ground as in grinding with, e.g., a ball mill. Press grinding is effective also in mitigating the phenomenon in which long fibers remain unground. Because of these, an alumina fiber aggregate having a given fiber length distribution can be efficiently produced through subsequent classification. Namely, the yield of fibers having a fiber length of 50-200 μm, which are the main component in the invention, can be heightened and the content of fibers having a fiber length exceeding 300 μm, which cause the fibrous aggregate to agglomerate, can be reduced.

The ground fibers are then classified. In the case where raw materials to be classified are powder, known techniques include air classification, elutriation classification, sieve classification, and the like. However, since fibers are classified in the invention, use of sieve classification is difficult. Air classification is a separating operation utilizing an air stream, while elutriation classification is a separating operation utilizing such properties of particles that the smaller the particles, the longer the time period required for the particles to sediment. In the invention, it is preferred to use air classification method, in particular, an air classifier which is based on the Coanda effect.

The air classifier based on the Coanda effect is an air classifier which utilizes the following properties of fibers: when ground fibers accelerated with an ejector or the like are injected from a nozzle into a classifying chamber using air as a carrier gas, then fibers having a short fiber length (fibers having a small mass) are more apt to flow along the Coanda block and fibers having a large fiber length (fibers having a large mass) fly farther, due to a difference in the force of inertia which the fibers receive. This classifier is equipped with a plurality of classifying edge blocks each having a classifying edge so that a plurality of products classified by fiber length can be collected. There are many patent documents concerning such classifiers (for example, JP-A-7-178371, JP-A-11-319717, and JP-A-2001-246327). There also are many commercial products of such classifiers, which can be used. Examples of the commercial products include trade name "Elbow-Jet", manufactured by Matsubo Corp., and trade name "Classiel", manufactured by Seishin Enterprise Co., Ltd.

The structure of air classifiers based on the Coanda effect is described in detail in those patent documents. The structure of an air classifier based on the Coanda effect is roughly explained below by reference to the diagrammatic sectional view of FIG. 1, which illustrates an example of the important part of the classifier. This air classifier 13 has a structure including: a block (not shown) disposed on the front left side of a rear side plate; a Coanda block 2; classifying edge blocks 6 and 8 having classifying edges 3 and 4; a raw-material feed nozzle 1; conduits 5, 7, and 9; and a front side plate (not shown) disposed so as to cover the upper sides of these members and to face the rear side plate. Classifying edge blocks are disposed in a number corresponding to the number of classification points (or the number of conduits; the number of conduits is larger by 1 than the number of classification points), and a classifying edge is attached to the tip of each of these classifying edge blocks so that the angle thereof can be freely regulated.

In FIG. 1, the first classifying edge block 6 and the second classifying edge block 8 are disposed, as classifying edge blocks, in this order in a direction away from the Coanda block 2 side. A first classifying edge 3 is attached to the tip of the first classifying edge block 6, and a second classifying edge 4 is attached to the tip of the second classifying edge block 8. This classifier has such a structure that air is introduced at a given flow rate through air introduction passages 11 and 12 formed by the disposition of an air introduction block 10 respectively on both sides thereof and the air introduced is discharged through the conduits 5, 7, and 9. The conduits 5, 7, and 9 are connected to cyclones (not shown), and alumina fiber aggregates are collected according to the classification points. Some classifiers have an air introduction edge in air introduction block 10 so that the amount of air to be introduced can be regulated.

Ground fibers injected from the raw-material feed nozzle 1 receive the force of inertia according to the fiber lengths (masses); a jet containing a large amount of fibers having a small fiber length flows through the conduit near the Coanda block 2, while a jet containing a large amount of fibers having a large fiber length flows through the conduit far from the Coanda block 2. As a result, alumina fiber aggregates having different fiber length distributions due to fiber length classification points can be collected from the cyclones.

It is preferred in the invention that at least two classification points corresponding to fiber lengths of 50 μm and 200 μm are used. Thus, an alumina fiber aggregate mainly including fibers having a fiber length smaller than 50 μm, an alumina fiber aggregate mainly including fibers having a fiber length of 50-200 μm, and an alumina fiber aggregate mainly including fibers having a fiber length exceeding 200 μm can be mainly collected from the cyclones. In FIG. 1, a jet containing a large amount of fibers α mainly including fibers having a fiber length smaller than 50 μm flows through the conduit 5, which is nearest to the Coanda block 2, and a jet containing a large amount of fibers β mainly including fibers having a fiber length of 50-200 μm flows through the conduit 7. Furthermore, a jet containing a large amount of fibers γ mainly including fibers having a fiber length exceeding 200 μm flows through the conduit 9, which is farthest from the Coanda block 2.

The number of classification points can be increased or reduced by changing the number of classifying edge blocks to be disposed. Three of more classification points may be used in the invention.

Meanwhile, the size (fiber length) at each classification point can be increased or reduced by regulating, for example, the distance between the Coanda block 2 and the classifying edge 3 or 4. When the distance (classifying-edge spacing) between the vertex of the first classifying edge 3 and the surface of the Coanda block 2, as measured on the straight line connecting the center point x of the Coanda block 2, i.e., the center point x of a circle formed with the curved surface of the Coanda block 2, to the vertex of the first classifying edge 3, is expressed by f1 and the distance between the vertex of the second classifying edge 4 and the surface of the Coanda block 2 is expressed by f2, then f1 is preferably 10-30 mm, more preferably 10-15 mm. Furthermore, f2 is preferably 30-50 mm, more preferably 30-40 mm.

The air to be injected from the raw-material feed nozzle 1 has a pressure of preferably 0.05-0.5 MPa, more preferably 0.2-0.3 MPa. In case where the pressure thereof is lower than 0.05 MPa, the fibers cannot be untangled. In case where the pressure thereof exceeds 0.5 MPa, many fibers come into the conduits for long fibers. In either case, there is a possibility that classification might be impossible.

In the invention, classified fibers are collected through the space between the first classifying edge 3 (fiber length, 50 μm) and the second classifying edge 4 (fiber length, 200 μm), whereby an alumina fiber aggregate of the invention can be easily produced. It is also possible to regulate a fiber length distribution by mixing, in a suitable proportion, the alumina fiber aggregates classified using two or more classification points and collected. For the mixing, a twin-cylinder mixer, Nauta mixer, or the like may be used.

In preparing a mixture using the alumina fiber aggregate of the invention, an ingredient such as, e.g., a silica powder, alumina powder, silicon nitride powder, aluminum nitride powder, boron nitride powder, glass fibers, and carbon fibers can be suitably incorporated.

In the case where the mixture is a resin mixture including the alumina fiber aggregate and a resin, as the resin, an epoxy resin, silicone resin, phenolic resin, melamine resin, urea resin, unsaturated polyester, fluororesin, polyamide such as polyimide, polyamideimide, and polyetherimide, polyester such as polybutylene terephthalate and polyethylene terephthalate, polyphenylenesulfide, wholly aromatic polyester, polysulfone, liquid-crystal polymer, polyethersulfone, polycarbonate, maleimide-modified resin, ABS resin, AAS resin (acrylonitrile.acrylic rubber.styrene), AES resin (acrylonitrile.ethylene.propylene.diene rubber.styrene), or the like can be used. Among these resins, preferred resins into which the alumina fiber aggregate of the invention is incorporated are thermosetting resins such as an epoxy resin, phenolic resin, melamine resin, polyurethane, and silicone. Epoxy resins are especially suitable. Such mixtures are used for producing those parts for domestic electrical appliances and motor vehicles which are required to have heat dissipation properties.

As a hardener for epoxy resins, for example, a novolac resin, bisphenol compound, trihydric phenol, acid anhydride such as maleic anhydride or phthalic anhydride, or aromatic amine such as m-phenylenediamine, diaminodiphenylmethane, or diaminodiphenyl sulfone. A hardening accelerator is incorporated according to need. As the hardening accelerator, 1,8-diazabicyclo(5,4,0)undecene-7, triphenylphosphine, benzyldimethylamine, 2-methylimidazole, or the like can be used.

In the case where the alumina fiber aggregate of the invention is used as a filler for resins, it is desirable to treat the surface of the alumina fiber aggregate with a silane coupling agent beforehand. The proportion of the silane coupling agent to be added is, for example, 0.01-10 parts by mass per 100 parts by mass of the alumina fiber aggregate. Examples of the silane coupling agent include epoxysilanes such as γ-glycidoxypropyltrimethoxysilane and β-(3,4-epoxycyclohexyl) ethyltrimethoxysilane, aminosilanes such as aminopropyltriethoxysilane, ureidopropyltriethoxysilane, and N-phenylaminopropyltrimethoxysilane, hydrophobic silane compounds such as phenyltrimethoxysilane, methyltrimethoxysilane, and octadecyltrimethoxysilane, and mercaptosilanes.

A resin mixture can be produced by mixing the various materials by means of a blender, mixer, or the like, subsequently melt-kneading the mixture by a heated roll kneading machine, kneader, single- or twin-screw extruder, or the like, cooling the kneaded mixture, and then pulverizing the mixture. This pulverized mixture is tableted beforehand. A transfer molding apparatus, ordinary mold, or the like, for example, is used to re-melt these tablets, and the melt is poured into the mold and cured, whereby a cured thermosetting resin of the invention is obtained. The content of the alumina fiber aggregate of the invention in the cured thermosetting resin is, for example, 1-60% by volume.

EXAMPLES

Examples 1 to 7 and Comparative Examples 1 to 4

Into a steel mold having an inner diameter of 8 cm and a depth of 20 cm was introduced 150 g of a commercial product of cottony alumina-silica fibers {$Al_2O_3$, 97% by mass (α-alumina, 55% by mass); $SiO_2$, 3% by mass; average fiber diameter, 3.8 μm; content by number of fibers having fiber length of 100 μm to 10 cm, 50% or higher}}. The cottony fibers were press-ground at a pressing pressure of 0-30 MPa. The resultant press-ground fibers had the properties shown in the Reference Example 1 of Table 1 and Table 2.

The ground fibers were classified by using an air classifier ("Elbow-Jet", manufactured by Matsubo Corp.) using two fiber-length classification points of 50 μm and 200 μm. In the air classifier, the classifying-edge openings f1 and f2 were adjusted to 10-20 mm and 20-45 mm, respectively, and the pressure of the air to be injected from the raw-material feed nozzle together with the raw material to be classified was adjusted to 0.25 MPa. The rate of feeding the ground fibers was adjusted to 1 kg/hr. An aggregate mainly including fibers having a fiber length smaller than 50 μm, an aggregate mainly including fibers having a fiber length of 50-200 μm, and an aggregate mainly including fibers having a fiber length exceeding 200 μm were collected from respective cyclones. Of these aggregates, the aggregate mainly including fibers having a fiber length of 50-200 μm was obtained as an alumina fiber aggregate of the invention.

Comparative Examples 5 to 7

Alumina fiber aggregates were produced in the same manner as in Example 1, except that the commercial product of cottony alumina-silica fibers was not press-ground but ground by a ball mill. Specifically, 20 kg of alumina balls (5 kg of balls having a diameter of 30 mm, 7 kg of balls having a diameter of 20 mm, and 8 kg of balls having a diameter of 10 mm) and 1 kg of the same commercial product of cottony alumina-silica fibers as in Example 1 were introduced into a ball mill having a capacity of 60 L. The cottony fibers were ground at a rotation speed of 30 rpm for 1 minute (Comparative Example 5), 5 minutes (Comparative Example 6), or 7 minutes (Comparative Example 7). (Note: The properties of the 7-minute-ground fibers are shown in the Reference Example 2 of Tables 1 and 2.) The resultant ball-mill-ground fibers were classified in the same manner as in Example 1.

Comparative Example 8

Commercial alumina long fibers ($Al_2O_3$, 70% by mass; $SiO_2$, 30% by mass; average fiber diameter, 10 μm; density 2.9 g/cm$^3$) were chopped so as to result in a fiber length of 100 μm.

Those alumina fiber aggregates were examined for fiber diameter and fiber length distribution by the method described above. Furthermore, the yield of the alumina fiber aggregate mainly including fibers having a fiber length of 50-200 μm was determined in the following manner. Moreover, the viscosity of an epoxy resin mixture and the thermal conductivity of a cured epoxy resin were determined by the following methods. The results thereof are shown in Table 1 and Table 2.

<Yield of Alumina Fiber Aggregate>

The fibrous aggregates obtained by classification, i.e., the alumina fiber aggregate mainly including fibers having a fiber length smaller than 50 μm, the alumina fiber aggregate mainly including fibers having a fiber length of 50-200 μm, and the alumina fiber aggregate mainly including fibers having a fiber length exceeding 200 μm, each was examined for mass. The percentage by mass of the alumina fiber aggregate mainly including fibers having a fiber length of 50-200 μm based on the total mass was determined and taken as the yield of that alumina fiber aggregate.

<Viscosity of Epoxy Resin Mixture>

Into 100 g of a liquid epoxy resin (trade name "Epikote 807", manufactured by Japan Epoxy Resins Co., Ltd.) was incorporated 10% by volume or 15% by volume of the alumina fiber aggregate. The resultant solution was examined for viscosity (cps(mPa·s)) at a measuring temperature of 30° C. and a shear rate of 2/s. In conversion to volume, the density of the alumina fiber aggregate was taken as 3.63 g/cm$^3$.

<Thermal Conductivity of Cured Epoxy Resin>

According to the compounding ratio shown below, the materials were weighed out and dry-blended in a plastic bag. Thereafter, the mixture was kneaded for 5 minutes by using mixing roll having a roll surface temperature of 100° C., cooled, and then pulverized. The pulverized mixture was molded with a transfer molding machine (temperature, 175° C.; transfer output, 5.1 MPa; molding time, 90 seconds) to produce a cured epoxy resin of a disk shape having a diameter of 28 mm and a thickness of 3 mm. Using a thermal conductivity meter ("Type ART-TC-1", manufactured by Agne), the thermal conductivity of the cured epoxy resin was determined by the temperature-gradient method at a measuring environment temperature of 23° C.

[Compounding Ratio]

Alumina fiber aggregate, 214.7 g (Note: Corresponding to 45% by volume of cured epoxy resin. In the case of the fibrous aggregate obtained from alumina long fibers, the amount thereof was changed to 171 g, because of the different density thereof, so as to correspond to 45% by volume of cured epoxy resin.)

Aminosilane coupling agent, 1.2 g (trade name "KBE-903", manufactured by Shin-Etsu Chemical Co., Ltd.)

Epoxy resin, 37.2 g (trade name "YX-4000H", manufactured by Japan Epoxy Resins Co., Ltd.)

Epoxy resin, 17.1 g (trade name "ECON-1020", manufactured by Nippon Kayaku Co., Ltd.)

Hardener, 28.3 g (trade name "PSM-4261", manufactured by Gun-ei Chemical Industry Co., Ltd.)

Wax, 1.9 g (trade name "WAX-E", manufactured by Clariant Japan K.K.)

Hardening accelerator, 0.7 g (trade name "TPP", manufactured by Hokko Chemical Industry Co., Ltd.)

TABLE 1

| | Classification conditions | | | | Frequency distribution regarding fiber diameter (%) | | | Average fiber | Frequency distribution regarding number of fibers (%) | | | | | | | Yield |
| | Pressing pressure (MPa) | f1 (mm) | f2 (mm) | Air Pressure (MPa) | <3 μm | 3-10 μm | >10 μm | diameter (μm) | <50 μm | 50-100 μm | >100 μm ≦200 μm | >200 μm | >300 μm | 50-200 μm | Total | (%) |
|---|---|---|---|---|---|---|---|---|---|---|---|---|---|---|---|---|
| Ref. Ex. 1 | 1 | — | — | — | 32 | 68 | 0 | 4 | 18 | 43 | 28 | 11 | 5 | 71 | 100 | — |
| Ref. Ex. 2 | — | — | — | — | 32 | 68 | 0 | 4 | 43 | 31 | 20 | 6 | 4 | 51 | 100 | — |
| Ex. 1 | 0.1 | 15 | 35 | 0.25 | 1 | 99 | 0 | 6 | 5 | 35 | 40 | 20 | 10 | 75 | 100 | 75 |
| Ex. 2 | 1 | 15 | 35 | 0.25 | 1 | 99 | 0 | 6 | 3 | 39 | 45 | 13 | 3 | 84 | 100 | 65 |
| Ex. 3 | 10 | 15 | 35 | 0.25 | 1 | 99 | 0 | 6 | 3 | 41 | 45 | 11 | 1 | 86 | 100 | 45 |
| Ex. 4 | 20 | 15 | 35 | 0.25 | 1 | 99 | 0 | 6 | 2 | 44 | 44 | 10 | 1 | 88 | 100 | 25 |
| Ex. 5 | 1 | 15 | 30 | 0.25 | 3 | 97 | 0 | 6 | 4 | 49 | 38 | 9 | 1 | 87 | 100 | 50 |
| Ex. 6 | 1 | 15 | 40 | 0.25 | 1 | 99 | 0 | 6 | 3 | 33 | 49 | 15 | 2 | 82 | 100 | 74 |
| Ex. 7 | 1 | 10 | 40 | 0.25 | 1 | 99 | 0 | 6 | 10 | 40 | 41 | 7 | 2 | 81 | 100 | 78 |
| Comp. Ex. 1 | 0 | Ground fibers had agglomerated and were unable to be fed to classifier. | | | | | | | | | | | | | | |
| Comp. Ex. 2 | 30 | Large amount of fine powder was clearly observed in ground fibers, and classification was hence omitted. | | | | | | | | | | | | | | |
| Comp. Ex. 3 | 1 | 15 | 20 | 0.25 | 15 | 85 | 0 | 5 | 5 | 64 | 23 | 8 | 1 | 87 | 100 | 33 |

TABLE 1-continued

| | Classification conditions | | | Frequency distribution regarding fiber diameter (%) | | | Average fiber diameter (µm) | Frequency distribution regarding number of fibers (%) | | | | | | | Yield (%) |
|---|---|---|---|---|---|---|---|---|---|---|---|---|---|---|---|
| | Pressing pressure (MPa) | f1 (mm) | f2 (mm) | Air Pressure (MPa) | <3 µm | 3-10 µm | >10 µm | | <50 µm | 50-100 µm | >100 µm ≦200 µm | >200 µm | >300 µm | 50-200 µm | Total | |
| Comp. Ex. 4 | 1 | 20 | 45 | 0.25 | 1 | 99 | 0 | 6 | 1 | 18 | 64 | 17 | 2 | 82 | 100 | 62 |
| Comp. Ex. 5 | — | Ground fibers had agglomerated and were unable to be fed to classifier. | | | | | | | | | | | | | | |
| Comp. Ex. 6 | — | 15 | 35 | 0.25 | 1 | 99 | 0 | 6 | 4 | 37 | 34 | 25 | 12 | 71 | 100 | 41 |
| Comp. Ex. 7 | — | 15 | 35 | 0.25 | 1 | 99 | 0 | 6 | 8 | 42 | 28 | 22 | 10 | 70 | 100 | 38 |
| Comp. Ex. 8 | — | Classification was omitted | | | 0 | 100 | 0 | 10 | 0 | 100 | 0 | 0 | 0 | 100 | 100 | — |

TABLE 2

| | Viscosity of epoxy resin mixture (cP) | | Thermal conductivity (W/m · K) |
|---|---|---|---|
| | 10% by volume | 15% by volume | |
| Reference Example 1 | 40 | 146 | 1.7 |
| Reference Example 2 | 57 | 186 | 1.3 |
| Example 1 | 27 | 105 | 2.1 |
| Example 2 | 16 | 61 | 2.2 |
| Example 3 | 17 | 60 | 2.0 |
| Example 4 | 15 | 55 | 1.9 |
| Example 5 | 18 | 85 | 1.9 |
| Example 6 | 21 | 98 | 1.9 |
| Example 7 | 17 | 71 | 1.8 |
| Comparative Example 1 | not measured | | |
| Comparative Example 2 | not measured | | |
| Comparative Example 3 | 30 | 120 | 1.5 |
| Comparative Example 4 | 35 | 137 | 1.7 |
| Comparative Example 5 | not measured | | |
| Comparative Example 6 | 60 | 180 | 1.7 |
| Comparative Example 7 | 57 | 165 | 1.7 |
| Comparative Example 8 | not measured because fibers were not dispersed | | 0.9 |

It was found from Tables 1 and 2 that, compared to the Comparative Examples, in the Examples, the viscosity after incorporating alumina fibers into the epoxy resin was lower and the moldability was better and the cured epoxy resin had a higher thermal conductivity.

It can be further seen that, compared to the fibers classified after grinding by a ball mill, the fibers classified after press grinding were higher in the yield of the alumina fiber aggregate mainly including fibers having a fiber length of 50-200 µm and were lower in the content of fibers having a fiber length exceeding 300 µm, which cause the fibrous aggregate to agglomerate. Moreover, by regulating the edge openings f1 and f2 of the classifier, fiber diameter and fiber length distribution were able to be regulated. This regulation attained low resin viscosities and enabled cured epoxy resins to have an exceedingly heightened thermal conductivity.

Examples 8 to 10 and Comparative Example 9

Alumina fiber aggregates were produced and evaluated in the same manners as in Example 2, except that various kinds of alumina-silica fibers having an $Al_2O_3/SiO_2$ mass ratio ranging from 50/50 to 100/0 were used. The results thereof are shown in Table 3. With respect to frequency distribution regarding fiber diameter, the proportion of fibers thinner than 3 µm and that of fibers of 3-10 µm were 1% and 99%, respectively, in each of Examples 8 to 10 and Comparative Example 9.

The chemical composition of alumina-silica fibers was regulated in the following manner. A spinning solution containing an aqueous aluminum oxychloride solution, silica sol, and polyvinyl alcohol and having a viscosity of 7,000 mPa·s was fed to a hollow disk having a diameter of 150 mm and having 300 holes with a diameter of 0.3 mm formed in the periphery of the disk, the spinning dope being fed at a rate of 20 mL/hr per each hole. This disk was rotated at a peripheral speed of 50 m/sec to thereby form liquid fibers. Thereafter, the liquid fibers were dried and solidified by hot air at 550° C. to obtain precursor fibers. Subsequently, the precursor fibers were burned in a roller hearth furnace at 1,300° C. to produce cottony alumina-silica fibers. In this process, the proportion of the aqueous aluminum oxychloride solution to the silica sol in the spinning solution was changed to thereby regulate the chemical composition.

TABLE 3

| | $Al_2O_3/SiO_2$ mass ratio in alumina fibers | Average fiber diameter (µm) | Frequency distribution regarding number of fibers (%) | | | | | | | Viscosity of epoxy resin mixture (cP) | | Thermal conductivity (W/m · K) |
|---|---|---|---|---|---|---|---|---|---|---|---|---|
| | | | <50 µm | 50-100 µm | >100 µm ≦200 µm | >200 µm | >300 µm | 50-200 µm | Total | 10 vol. % | 15 vol. % | |
| Ex. 8 | 100/0 | 6.0 | 6 | 39 | 42 | 13 | 3 | 81 | 100 | 13 | 52 | 2.4 |
| Ex. 9 | 80/20 | 6.0 | 3 | 37 | 44 | 16 | 3 | 81 | 100 | 12 | 55 | 1.4 |
| Ex. 10 | 70/30 | 6.0 | 3 | 35 | 43 | 19 | 4 | 78 | 100 | 12 | 47 | 1.1 |
| Comp. Ex. 9 | 50/50 | 6.2 | 2 | 37 | 43 | 18 | 4 | 80 | 100 | 12 | 56 | 0.7 |

While the invention has been described in detail and with reference to specific embodiments thereof, it will be apparent to one skilled in the art that various changes and modifications can be made therein without departing from the spirit and scope thereof.

This application is based on a Japanese patent application filed on Oct. 11, 2007 (Application No. 2007-265737), the entire contents thereof being herein incorporated by reference. All the references cited herein are incorporated as a whole.

INDUSTRIAL APPLICABILITY

The alumina fiber aggregate of the invention can be used as a filler for various materials such as, for example, resins, coating materials, metals, and ceramics. The cured epoxy resin of the invention can be used, for example, as parts of domestic electrical appliances, automotive parts, and the like which are required to have thermal conductivity.

The invention claimed is:

1. An alumina fiber aggregate which, when examined by the electron microscope method, gives a frequency distribution regarding number of fibers, wherein the number of fibers having a fiber length of 50-200 μm is 70% or more (including 100%), the number of fibers having a fiber length smaller than 50 μm is 30% or less (including 0), the number of fibers of 50-100 μm is 30-50%, the number of fibers longer than 100 μm but not longer than 200 μm is 30-50%, and the number of fibers longer than 200 μm is 20% or less (including 0), and which comprises 70-100% by mass of $Al_2O_3$ and 0-30% by mass of $SiO_2$.

2. The alumina fiber aggregate according to claim 1, wherein the number of fibers having a fiber length of 50-200 μm is 80% or more (including 100%), the number of fibers having a fiber length smaller than 50 μm is 10% or less (including 0), the number of fibers of 50-100 μm is 35-45%, the number of fibers longer than 100 μm but not longer than 200 μm is 35-45%, the number of fibers longer than 200 μm is 15% or less (including 0), and the number of fibers longer than 300 μm is 5% or less (including 0), wherein the fiber aggregate has an average fiber diameter of 3-10 μm and the number of fibers having a fiber diameter smaller than 3 μm is less than 5%.

3. A cured thermosetting resin which comprises the alumina fiber aggregate according to claim 1 or 2.

* * * * *